United States Patent
Bauer et al.

(10) Patent No.: US 9,772,204 B2
(45) Date of Patent: Sep. 26, 2017

(54) LENGTH-MEASURING DEVICE

(71) Applicant: DR. JOHANNES HEIDENHAIN GmbH, Traunreut (DE)

(72) Inventors: Kilian Bauer, Surberg (DE); Wolfgang Pucher, Traunstein (DE); Thomas Sigl, Stephanskirchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 146 days.

(21) Appl. No.: 14/934,164

(22) Filed: Nov. 6, 2015

(65) Prior Publication Data
US 2016/0146641 A1    May 26, 2016

(30) Foreign Application Priority Data
Nov. 26, 2014   (EP) ..................... 14194858

(51) Int. Cl.
*G01B 5/00* (2006.01)
*G01D 5/347* (2006.01)
*B23Q 17/22* (2006.01)

(52) U.S. Cl.
CPC ....... *G01D 5/34715* (2013.01); *G01B 5/0014* (2013.01); *G01D 5/34707* (2013.01); *B23Q 17/2233* (2013.01)

(58) Field of Classification Search
CPC ........... G01D 5/34715; G01D 5/34707; G01B 5/0014; G01B 3/10; G01B 3/1071; G01B 2003/1079; B23Q 17/2233
USPC .................... 33/700, 706, 712, 645
See application file for complete search history.

(56) References Cited

U.S. PATENT DOCUMENTS

| 4,777,728 A | 10/1988 | Ludicke |
| 5,711,084 A | 1/1998 | Spanner et al. |
| 8,359,764 B2 * | 1/2013 | Pucher ............... G01D 5/34753 33/702 |
| 8,850,711 B2 * | 10/2014 | Schenk ............... G01D 5/24442 33/700 |
| 2008/0191107 A1 | 8/2008 | Pucher et al. |

(Continued)

FOREIGN PATENT DOCUMENTS

| DE | 102005027025 A1 | 12/2006 |
| EP | 0264801 A1 | 4/1988 |

(Continued)

*Primary Examiner* — Yaritza Guadalupe-McCall
(74) *Attorney, Agent, or Firm* — Leydig, Voit & Mayer, Ltd.

(57) ABSTRACT

A length-measuring device includes a scale and a mounting element. The mounting element has a first fastening portion by which the mounting element is stationarily attached to the scale and a second fastening portion configured to be stationarily attached to a support. An arrangement of a plurality of flexible struts is provided between the first fastening portion and the second fastening portion which, through flexure, allows the first fastening portion to move relative to the second fastening portion perpendicularly to the longitudinal direction. The arrangement of struts is configured to compensate for a flexure-induced change in length of the struts in such a way that no movement will result from the flexure-induced change in length between the first fastening portion and the second fastening portion in the longitudinal direction.

16 Claims, 4 Drawing Sheets

(56) References Cited

U.S. PATENT DOCUMENTS

| | | | |
|---|---|---|---|
| 2009/0260243 A1* | 10/2009 | Evans | B25J 17/0216 33/502 |
| 2011/0219635 A1* | 9/2011 | Rangelow | G03F 9/7038 33/645 |
| 2013/0019489 A1* | 1/2013 | Kummetz | G01D 5/24442 33/770 |
| 2016/0146641 A1* | 5/2016 | Bauer | G01D 5/34715 33/706 |
| 2016/0187117 A1* | 6/2016 | Otsuka | G01B 3/1071 33/770 |

FOREIGN PATENT DOCUMENTS

| | | |
|---|---|---|
| EP | 0736750 A2 | 10/1996 |
| WO | WO 0227265 A2 | 4/2002 |

* cited by examiner

LENGTH-MEASURING DEVICE

CROSS-REFERENCE TO PRIOR APPLICATION

Priority is claimed to European Patent Application No. EP 14 194 858.8, filed on Nov. 26, 2014, the entire disclosure of which is hereby incorporated by reference herein.

FIELD

The present invention relates to a length-measuring device having a scale extending in a longitudinal direction and having a measuring graduation for position measurement in the longitudinal direction and a mounting element by which the scale can be attached to a support such that it is fixed in the longitudinal direction.

BACKGROUND

Such length-measuring devices are used, in particular, in machine tools for measuring the position of a tool relative to a workpiece to be machined, in coordinate measuring machines for determining the position and dimensions of test objects, as well as in the semiconductor industry. In such devices, the scale is directly attached to a support, for example, the drive unit (e.g., a linear motor), or the scale is attached to a component driven by the drive unit. A scanning unit of the length-measuring device is stationarily disposed opposite the moving scale on a second object whose relative position with respect to the support is to be measured.

To create a fixed point of the scale with respect to the support, it is known to fix the scale to the support at one point such that it is stationary in the measurement direction.

In most cases, the scale and the support are composed of materials having different thermal expansion properties. The stationary fixation has to be implemented in such a way that no constraining forces will be exerted by the support on the scale in response to temperature changes.

In accordance with EP 0 264 801 A1, the stationary fixation of the scale is effected by means of a ball which is inserted in a V-groove of the scale, on the one hand, and in a V-groove of a holder, on the other hand, thereby creating an interlocking fit. The scale is urged by a spring against the ball, so that the interlocking fit is ensured between the ball and the scale, on the one hand, and between the ball and the holder, on the other hand.

In accordance with WO 02/27265 A2, the stationary fixation with respect to the measurement direction is effected by means of a mounting element having a first fastening portion by which it is stationarily attached to the scale and a second fastening portion by which it is attached to a support. Provided between the first fastening portion and the second fastening portion is a roller bearing which allows displacement of the scale relative to the support in a direction perpendicular to the measurement direction.

SUMMARY

In an embodiment, the present invention provides a length-measuring device having a scale and at least one mounting element. The scale extends in a longitudinal direction and has a measuring graduation for position measurement in the longitudinal direction. The scale is attachable to a support by the at least one mounting element such that the scale is fixed in the longitudinal direction. The at least one mounting element has a first fastening portion by which the at least one mounting element is stationarily attached to the scale and a second fastening portion configured to be stationarily attached to the support. An arrangement of a plurality of flexible struts is provided between the first fastening portion and the second fastening portion which, through flexure, allows the first fastening portion to move relative to the second fastening portion perpendicularly to the longitudinal direction. The arrangement of struts is configured to compensate for a flexure-induced change in length of the struts in such a way that no movement will result from the flexure-induced change in length between the first fastening portion and the second fastening portion in the longitudinal direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
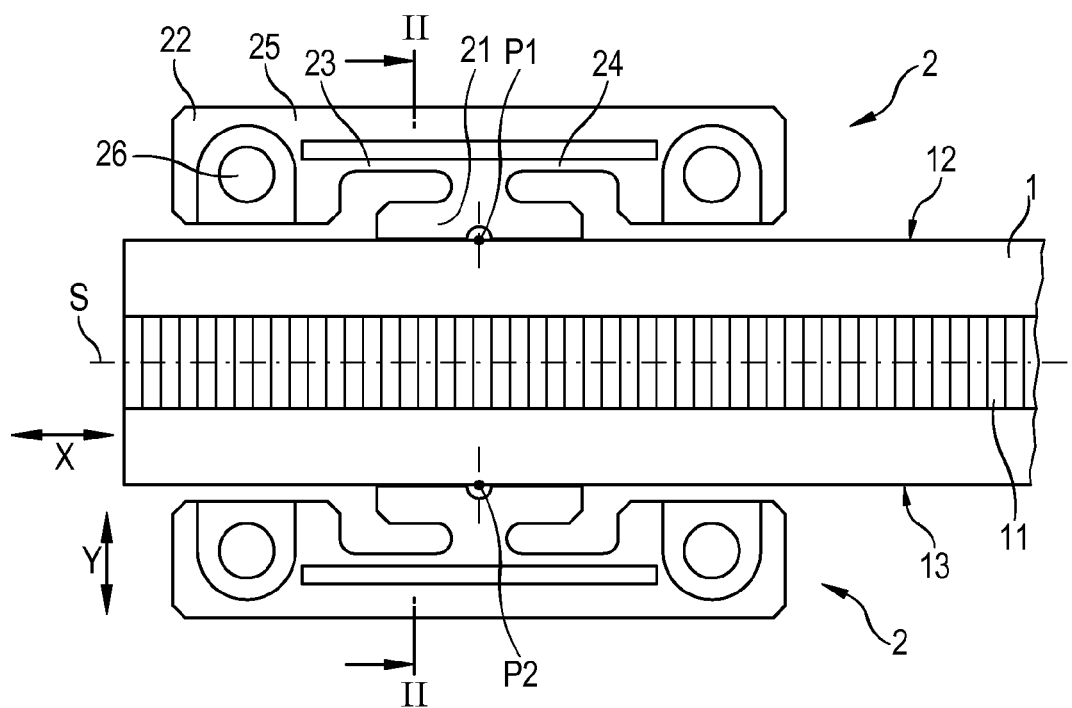
FIG. 1 is a schematic view of a length-measuring device according to an embodiment of the present invention.

In an embodiment, the present invention provides a length-measuring device that is compact in design and permits accurate position measurement.

The length-measuring device designed in accordance with an embodiment of the present invention includes a scale extending in a longitudinal direction and having a measuring graduation for position measurement in the longitudinal direction. The scale is attachable by at least one mounting element to a support such that it is fixed in the longitudinal direction. The mounting element has a first fastening portion by which it is stationarily attached to the scale and a second fastening portion adapted to be stationarily attached to the support, a means allowing the first fastening portion to move relative to the second fastening portion perpendicularly to the longitudinal direction being provided between the first fastening portion and the second fastening portion. In accordance with the present invention, this means is an arrangement of a plurality of flexible struts which, through flexure, allows the first fastening portion to move relative to the second fastening portion perpendicularly to the longitudinal direction, the arrangement of struts being adapted to compensate for the flexure-induced change in length of the struts in such a way that no movement will result therefrom between the first fastening portion and the second fastening portion in the longitudinal direction.

In the non-loaded and thus non-deflected state, the struts advantageously extend parallel to the longitudinal direction. This ensures a particularly stable and reliable fixation in the longitudinal direction.

Each of the struts is configured as a flexure bearing which is stiff in the longitudinal direction and capable of being flexed out perpendicularly thereto.

The required compensation of the change in length of the struts may be accomplished by elongation thereof. For this purpose, struts are arranged to extend from the first fastening portion in opposite directions to a rigid bridge that rigidly interconnects these struts in the longitudinal direction, so that the change in length caused by flexure of the struts is compensated for by elongation of the struts. The struts function as tension members in the longitudinal direction and as flexure bars in the direction transverse thereto.

The struts extending in opposite directions have identical spring characteristics, so that they deform symmetrically.

The required compensation of the change in length of the struts may also be achieved in that a strut originating at the first fastening portion and a strut originating at the second fastening portion extend in the same direction toward a linkage which interconnects the two struts, and in that the change in length caused by flexure of the struts is compensated for by displacement of the linkage in the longitudinal direction.

This arrangement of struts may again advantageously extend symmetrically to the fixed point on both sides thereof, so that two each of the struts extend in a common direction and are interconnected at their ends by a respective linkage which is displaced in the longitudinal direction (measurement direction) in response to a deflection of the two struts and compensates for the oppositely directed flexures of the two interconnected struts.

It is particularly advantageous that one each of the mounting elements be disposed at a respective one of opposite positions with respect to the scale. In this context, the term "opposite" is understood to mean symmetrical to the scale's axis of symmetry extending in the longitudinal direction (measurement direction).

The present invention provides stationary fixation of the scale using simple and space-saving means, the stationary fixation preventing constraining forces from being exerted by the support on the scale, even during temperature changes.

Figure 2:
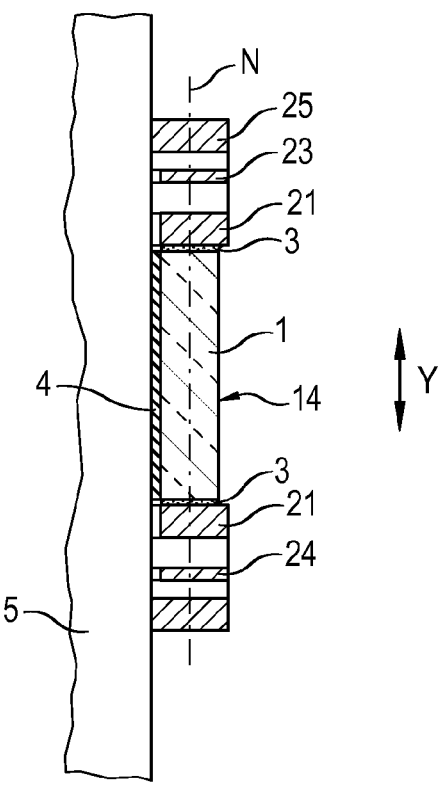
FIG. 2 is a cross-sectional view of the length-measuring device taken along line II-II of FIG. 1.
Figure 3:
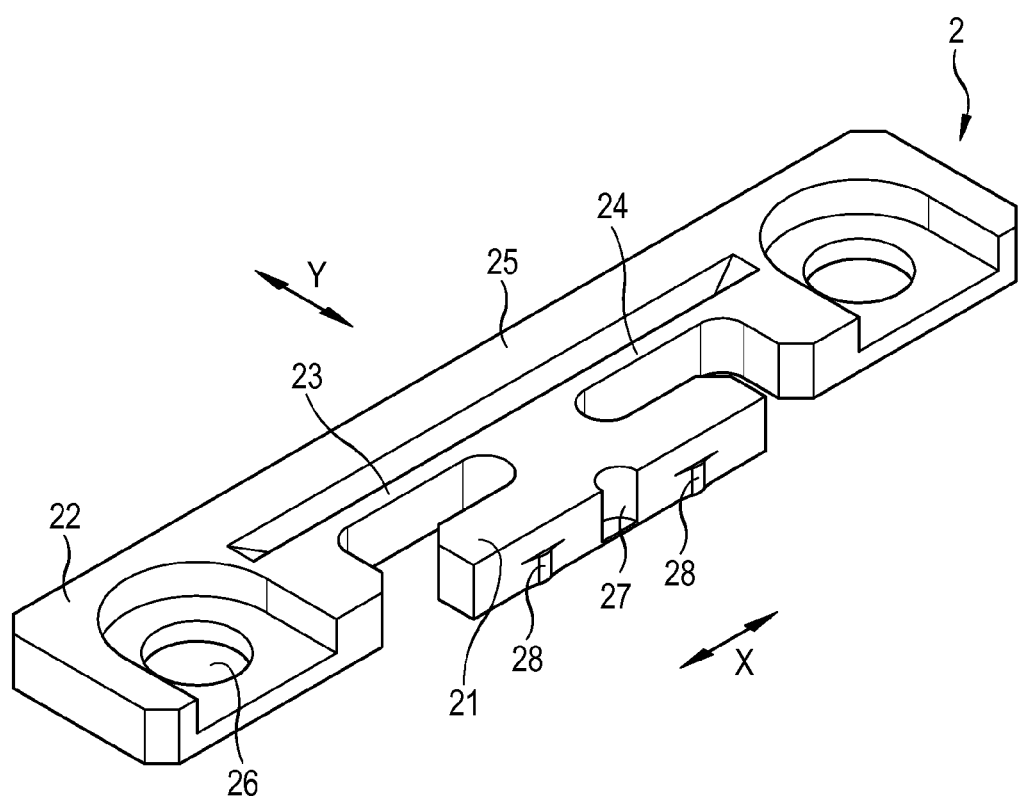
FIG. 3 is a perspective view of a mounting element of the length-measuring device of FIG. 1.

A first embodiment of the present invention will now be described with reference to FIGS. 1 through 3. This length-measuring device designed in accordance with the present invention includes a scale 1 extending in a longitudinal direction X and having a measuring graduation 11. Measuring graduation 11 is configured as a photoelectrically scannable incremental graduation for high-accuracy position measurement in longitudinal direction X. Alternatively, the measuring graduation may also be an absolute code or a measuring graduation for measurement in longitudinal direction X and, in addition, a second direction Y extending perpendicularly thereto. The measuring graduation for measurement in two dimensions X and Y may be configured as a cross grating or a checkerboard grating.

Scale 1 is preferably composed of a material having a negligibly small thermal expansion coefficient, in particular a thermal expansion coefficient α of less than $1.5 \times 10^{-6} K^{-1}$, more particularly of less than $0.1 \times 10^{-6} K^{-1}$, in the temperature range from 0° to 50° C. Such materials include glass and glass-ceramic materials (e.g., ZERODUR), as well as metals such as Invar, for example.

Scale 1 preferably has a rectangular cross section with two opposite side faces 12 and 13 extending in the longitudinal direction. Measuring graduation 11 is disposed in a measuring graduation plane 14 extending perpendicularly to these side faces 12 and 13.

Scale 1 may be placed over its entire length on a support 5, such as, for example, the table of a machine tool or measuring machine, and retained thereto in various ways. Such retention may be accomplished by clamping claws or elastic adhesives or by adherence caused by a viscous or viscoelastic liquid film, or also by an air or ball bearing system. In the example shown, the retention of scale 1 is accomplished by means of layer 4 adapted to adhesively retain scale 1 to support 5. By providing layer 4 between scale 1 and support 5, it is ensured that scale 1 is mechanically decoupled from support 5. During temperature changes, support 5 and scale 1 can expand independently of one another.

To create a fixed point, also called "reference point", scale 1 must be fixed to support 5 at a position P1 such that it is stationary in longitudinal direction X. To this end, at least one mounting element 2 is provided by which scale 1 can be attached to support 5 such that it is fixed in longitudinal direction X. Mounting element 2 has a first fastening portion 21 by which it is stationarily attached to scale 1. Mounting element 2 further has a second fastening portion 22 adapted to be stationarily attached to support 5.

Provided between first fastening portion 21 and second fastening portion 22 are means allowing for thermally induced expansion of scale 1 relative to support 5 in a direction perpendicular to longitudinal direction X; i.e., in direction Y. To this end, first fastening portion 21 is connected to second fastening portion 22 by two struts 23 and 24 which are oriented parallel to longitudinal direction X and which, through flexure and elongation, allow first fastening portion 21 to move relative to second fastening portion 22 perpendicularly to longitudinal direction X, the two struts 23 and 24 extending from first fastening portion 21 in opposite directions. The arrangement of struts 23, 24, through flexure, allows first fastening portion 21 to move relative to second fastening portion 22 perpendicularly to longitudinal direction X, the arrangement further being adapted to compensate for the flexure-induced change in length of struts 23, 24 in such a way that no movement will result therefrom between first fastening portion 21 and second fastening portion 22 in longitudinal direction X.

Struts 23, 24 are arranged in mirror symmetry with respect to position P1 and have identical spring characteristics. First fastening portion 21 is disposed centrally between the two struts 23, 24 with respect to longitudinal direction X. By providing struts 23, 24 as flexure joints and at the same time as elongation elements, it is ensured that transverse movement between scale 1 and support 5 is possible, while at the same time scale 1 maintains its stationary position P1 in longitudinal direction X with respect to support 5.

A particularly stable construction is achieved for mounting element 2 if second fastening portion 22 includes a rigid bridge 25 that interconnects the two struts 23 and 24 at their ends.

In accordance with an embodiment of the present invention, at least one mounting element 2 is provided at fixed point P1. It is particularly advantageous to arrange two substantially identically configured mounting elements 2 at opposite points P1 and P2 such that they are symmetrical with respect to axis of symmetry S of scale 1. This provides the advantage of allowing for thermal expansion in direction Y symmetrically with respect to axis of symmetry S, so that scale 1 is attached in a thermally stable manner with respect to axis of symmetry S. Since the two mounting elements 2 are substantially identical in configuration, they are given the same reference numeral. In FIG. 1, only one of them is provided with all reference numerals.

First fastening portions 21 of mounting elements 2 are each disposed at a respective one of the two side faces 12, 13. A particularly advantageous attachment is achieved when first fastening portion 21 is attached to the respective side face 12 or 13 by a material-to-material bond. In particular, the material-to-material bond is created by a firmly hardening adhesive 3. A metering pocket 27 is provided on mounting element 2 to receive this adhesive 3. In order to create a defined adhesive gap between scale 1 and mounting element 2, mounting element 2 is provided with spacers 28 which are brought into contact with side face 12, or 13, respectively. Spacers 28 are spaced apart in measurement direction X and ensure a defined adhesive gap between mounting element 2 and side face 12, respectively 13, of scale 1. An adhesive is introduced on both sides of each of the two spacers 28, as considered in measurement direction X.

It is particularly advantageous if struts 23, 24 are arranged in a plane containing the neutral fiber N of the scale, and if measuring graduation 11 is oriented in a plane parallel to this neutral plane of scale 1.

Second fastening portion 22 of mounting element 2 includes at least one opening 26 to receive a fixing screw for stationary attachment to the support 5. Bridge 25 of mounting element 2 substantially prevents struts 23 and 24 from being deformed during the screwing operation.

Struts 23, 24 take the form of flexure bearings. It is particularly advantageous that mounting element 2 be formed as a single piece, and that struts 23, 24 each be configured as weak points between first fastening portion 21 and second fastening portion 22.

In the following, a second embodiment of the present invention will be described with reference to FIG. 4. A strut 23.1 and a strut 24.1 originating at respective first and second fastening portions 21.1, 22.1 are arranged such that they extend in the same direction toward a linkage 29. Linkage 29 is freely movable and interconnects the two struts 23.1, 24.1. Due to this arrangement of struts 23.1, 24.1, the change in length caused by flexure of struts 23.1, 24.1 is compensated for by displacement of linkage 29 in longitudinal direction X.

In order to provide an arrangement which is particularly free of forces in longitudinal direction X, an arrangement that is symmetrical in longitudinal direction X is advantageous here, too. Such an arrangement is exemplarily shown in FIG. 5. In this case, two further struts 23.2, 24.2 are provided. These further struts 23.2, 24.2 originating at first fastening portion 21.2 and second fastening portion 22.2, respectively, are arranged such that they extend in the same direction toward a further linkage 29.1. This further linkage 29.1 is also freely movable and interconnects the two further struts 23.2, 24.2.

Figure 4:
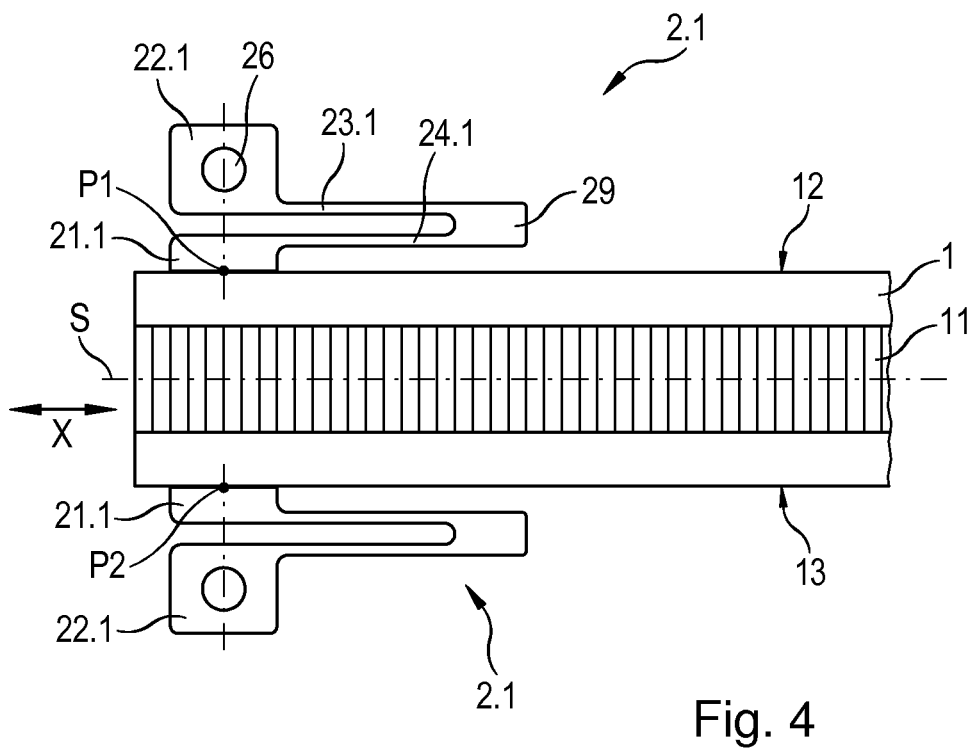
FIG. 4 is a view of a second embodiment of a length-measuring device according to the present invention.
Figure 5:
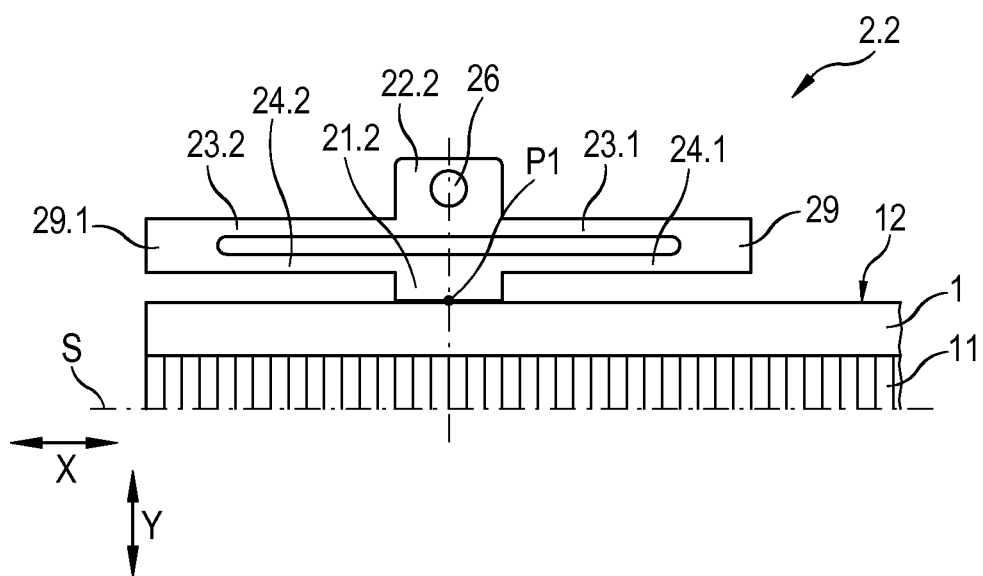
FIG. 5 is a view of a third embodiment of a length-measuring device according to the present invention.

In the arrangements of mounting elements 2.1 and 2.2 according to FIGS. 4 and 5, it is also particularly advantageous to arrange substantially identically configured mounting elements 2.1, respectively 2.2, opposite each other and symmetrically with respect to axis of symmetry S of scale 1.

Figure 6:
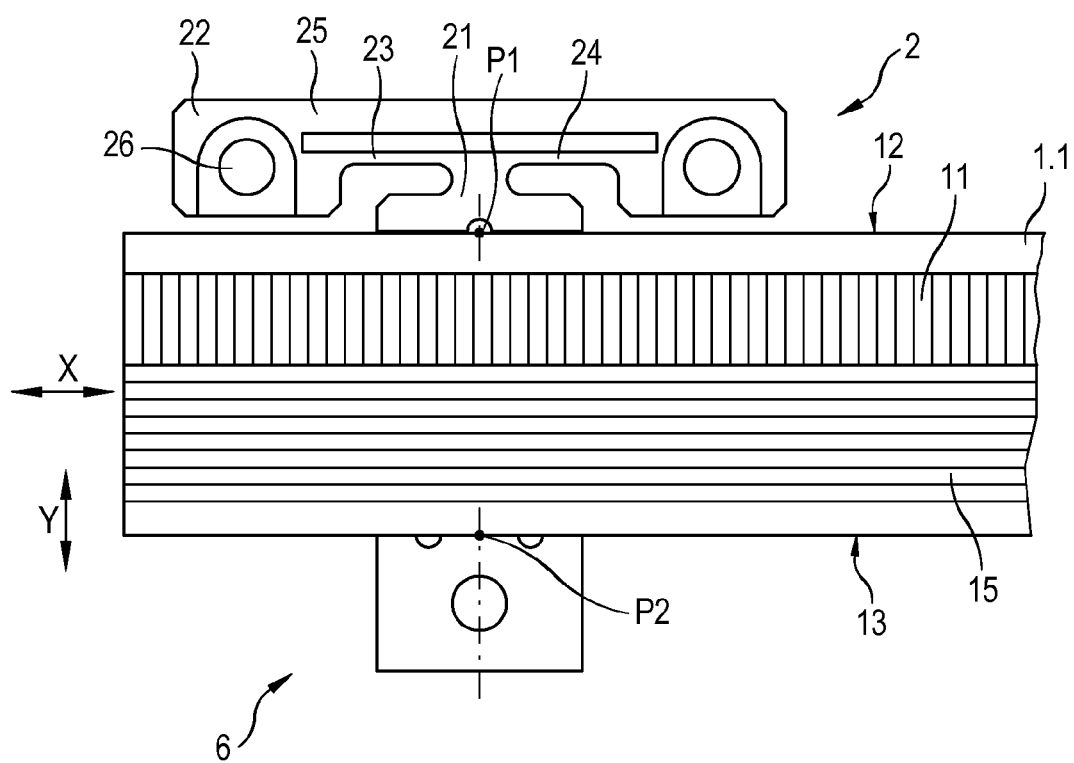
FIG. 6 is a view showing a fourth embodiment.

FIG. 6 illustrates a further exemplary embodiment of the present invention. Mounting element 2 is mounted at a position P1 (fixed point) on a side 12 of scale 1.1, as illustrated earlier with reference to FIGS. 1 through 3. On the opposite side 13 of scale 1.1, a fastening element 6 is mounted at a position P2, this fastening element being adapted to fix scale 1.1 to the support at point P2 such that it is stationary in the X direction and in the Y direction.

Fastening element 6 is attached to side face 13 of scale 1.1 by a material-to-material bond, in particular by means of a firmly hardening adhesive. For stationary attachment to support 5, fastening element 6 has an opening to receive a screw by which the fastening element can be screwed stationarily to the support.

Such stationary fixation of scale 1.1 on one side is particularly suitable for a scale 1.1 which, in addition to measuring graduation 11, has a further measuring graduation 15 which is adapted for position measurement in the Y direction. As shown in FIG. 6, additional measuring graduation 15 is arranged in the Y direction spatially adjacent to measuring graduation 11. In this case, fastening element 6 is disposed on the side of scale 1.1 where additional measuring graduation 15 is provided, and mounting element 2, which provides compensation in the Y direction, is disposed on the side of scale 1.1 where measuring graduation 11 is provided.

In all of the exemplary embodiments, struts 23, 24, 23.1, 24.1, 23.2, 24.2 may be integrally formed with the respective first and second fastening portions 21, 21.1, 21.2, 22, 22.1, 22.2. Alternatively, the struts may be spring steel elements attached to the fastening portions.

Mounting element 2, 2.1, 2.2 is advantageously made from a material that has the same thermal expansion coefficient as the material of which scale 1, 1.1 is composed. In addition, adhesive 3 may also have this thermal expansion coefficient.

The present invention is not limited to the photoelectric scanning principle. In particular, the measuring graduation may also be adapted to be scannable magnetically or inductively.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:
1. A length-measuring device comprising:
a scale extending in a longitudinal direction and having a measuring graduation for position measurement in the longitudinal direction;

at least one mounting element by which the scale is attachable to a support such that the scale is fixed in the longitudinal direction, the at least one mounting element having a first fastening portion by which the at least one mounting element is stationarily attached to the scale and a second fastening portion configured to be stationarily attached to the support; and an arrangement of a plurality of flexible struts between the first fastening portion and the second fastening portion which, through flexure, allows the first fastening portion to move relative to the second fastening portion perpendicularly to the longitudinal direction, the arrangement of struts being configured to compensate for a flexure-induced change in length of the struts in such a way that no movement will result from the flexure-induced change in length between the first fastening portion and the second fastening portion in the longitudinal direction.

2. The length-measuring device as recited in claim 1, wherein the struts are oriented parallel to the longitudinal direction.

3. The length-measuring device as recited in claim 1, wherein a first and a second one of the struts extend from the first fastening portion in opposite directions to each other, and wherein the flexure-induced change in length caused by flexure of the struts is compensated for by elongation of the struts.

4. The length-measuring device as recited in claim 3, wherein the first and the second struts extend from the first fastening portion in opposite directions to a rigid bridge that rigidly interconnects the two struts in the longitudinal direction.

5. The length-measuring device as recited in claim 1, wherein one of the struts originating at the first fastening portion and a respective one of the struts originating at the second fastening portion extend in the same direction toward a respective linkage which interconnects the two struts, and wherein the flexure-induced change in length of the struts is compensated for by displacement of the linkage in the longitudinal direction.

6. The length-measuring device as recited in claim 1, wherein the struts are arranged in a plane containing a neutral fiber of the scale, and wherein a measuring graduation plane is oriented parallel to the plane.

7. The length-measuring device as recited in claim 1, wherein the scale has a rectangular cross section with two opposite side faces extending in the longitudinal direction, and wherein the measuring graduation is disposed within a measuring graduation plane extending perpendicularly to the side faces.

8. The length-measuring device as recited in claim 7, wherein the first fastening portion of the at least one mounting element is attached to one of the two side faces by a material-to-material bond.

9. The length-measuring device as recited in claim 8, wherein the material-to-material bond is an adhesive bond.

10. The length-measuring device as recited in claim 9, wherein the first fastening portion has spacers which are spaced apart in the longitudinal direction and contact a respective one of the side faces of the scale, the spacers defining an adhesive gap between the first fastening portion and the respective side face of the scale, and wherein an adhesive is disposed in the adhesive gap in the longitudinal direction on both sides of each of the spacers.

11. The length-measuring device as recited in claim 1, wherein the scale is composed of a material having a thermal expansion coefficient $\alpha$ of less than $1.5 \times 10^{-6} K^{-1}$ in a temperature range from 0° to 50° C.

12. The length-measuring device as recited in claim 11, wherein the thermal expansion coefficient $\alpha$ of the scale in the temperature range is less than $0.1 \times 10^{-6} K^{-1}$.

13. The length-measuring device as recited in claim 1, wherein the at least one mounting element is formed as a single piece.

14. The length-measuring device as recited in claim 1, wherein the second fastening portion includes at least one opening configured to receive a fixing screw.

15. The length-measuring device as recited in claim 1, wherein the device includes two of the mounting elements disposed at opposite positions with respect to the scale.

16. The length-measuring device as recited in claim 1, wherein the at least one mounting element is disposed at a first position of the scale, and wherein a fastening element is attached to the scale at a second position opposite to the first position, the fastening element being adapted to fix the scale to the support such that the scale is stationary in the longitudinal direction and in a direction transverse to the longitudinal direction.

* * * * *